Fig. 1

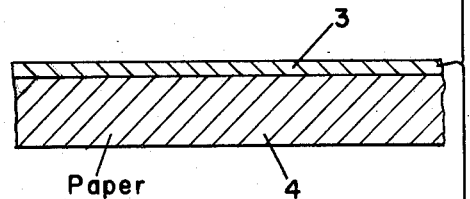

Paper

Dried deposit of a coating comprising
(1) pigmentary material and
(2) ammonium salt of a copolymer, having a $T_i$ value over 20°C. up to about 35°C. of:
 (a) at least 68% vinyl acetate
 (b) 7 to 30% of $(C_1-C_4)$ — alkyl acrylate
 (c) 2 to 7% of itaconic acid, maleic acid, or maleic anhydride.

Fig. 2

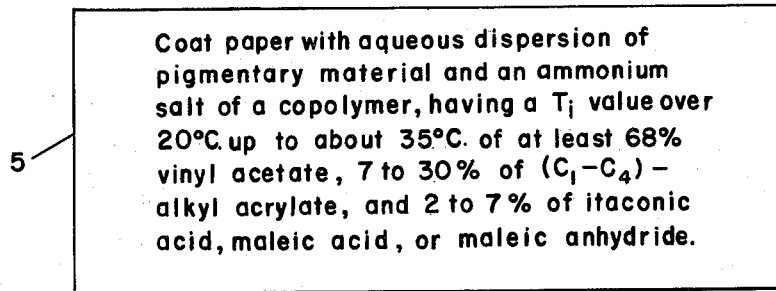

Coat paper with aqueous dispersion of pigmentary material and an ammonium salt of a copolymer, having a $T_i$ value over 20°C. up to about 35°C. of at least 68% vinyl acetate, 7 to 30% of $(C_1-C_4)$ — alkyl acrylate, and 2 to 7% of itaconic acid, maleic acid, or maleic anhydride.

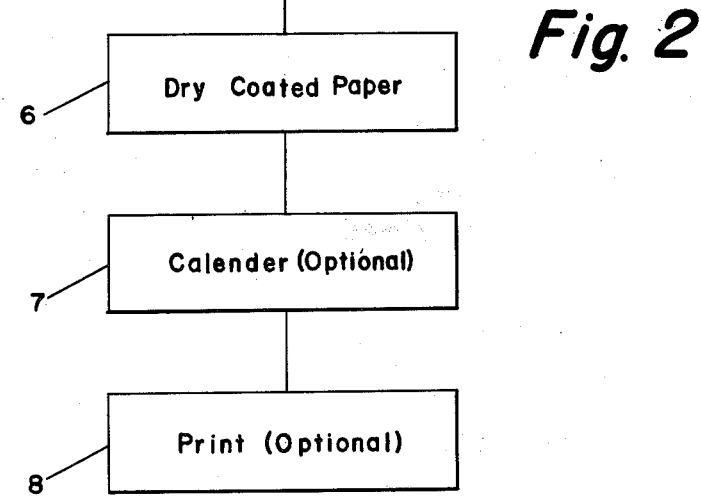

Dry Coated Paper

Calender (Optional)

Print (Optional)

United States Patent Office 3,152,922
Patented Oct. 13, 1964

3,152,922
MINERAL COATED PAPER PRODUCTS AND
METHODS FOR MAKING THEM
Paul J. McLaughlin, Moorestown, N.J., and Walter W.
Toy, Philadelphia, Pa., assignors to Rohm & Haas Company, Philadelphia, Pa., a corporation of Delaware
Filed Jan. 22, 1962, Ser. No. 167,890
6 Claims. (Cl. 117—155)

This invention relates to mineral-coating compositions and to paper coated therewith. Mineral-coating compositions, such as are commonly applied to paper body stock in the manufacture of mineral-coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e.g., so that it will not be removed by the pull of printing ink during the printing operation. Nevertheless, the particular adhesive used does have considerable influence upon the working qualities of the coating composition; e.g., viscosity, flow, spreadability, etc. Likewise, the adhesive used in the coating composition has a definite effect upon the quality and appearance of the finished coated paper made therewith.

In U.S. Patents 2,790,735, 2,790,736 and 2,874,066, copolymers containing a small proportion of either a salt or an amide of certain acids have been proposed for use as binders in mineral-coating compositions on paper. These patents stress the fact that the $T_i$ of the copolymer should not be over 20° C. The $T_i$ value referred to is the transition temperature or inflection temperature which is found by plotting the modulus of rigidity against temperature. A convenient method for determining modulus of rigidity and transition temperature is described by I. Williamson, British Plastics, 23, 87–90, 102 (September 1950). The $T_i$ value here used is that determined at 300 kg./cm.$^2$.

Besides the salt or amide, the copolymers used in the several patents contained esters of acrylic acid and higher alkyl esters of methacrylic acid and the patents suggest that the copolymers may also contain small proportions of certain comonomers which normally provide polymers having higher $T_i$ values provided the copolymer obtained with these latter comonomers did not have a $T_i$ above 20° C. The latter group of copolymers named in these patents are the methacrylates of alcohols having from 1 to 4 carbon atoms, styrene, acrylonitrile, methacrylonitrile, vinyl acetate, vinyl chloride, and vinylidene chloride.

Surprisingly, it has now been found that water-insoluble salts of copolymers containing a major proportion of vinyl acetate, from 7 to 30% by weight of a ($C_1$–$C_4$) alkyl acrylate and from 2 to 7% by weight of certain copolymerizable unsaturated dicarboxylic acids having a $T_i$ value above 20° C. up to 35° C. provide binders in mineral-coating compositions for paper which produce coatings having at least as good properties, and in some cases superior properties to those produced by the copolymers of the prior art having $T_i$ values of 20° C. or less. Copolymers containing a major proportion of vinyl acetate such that the $T_i$ is above 20° C. and up to about 35° C. are unique in this respect since similar high-$T_i$ copolymers containing the methacrylates, styrene, the nitriles, vinyl chloride, or vinylidene chloride mentioned in the patents fail to provide desirable coatings and are quite inferior to the binders of the several patents.

In the drawing, FIG. 1 is a diagrammatic cross-sectional view, much enlarged, of a coated paper of the present invention, and FIG. 2 is a flow diagram illustrating the process of coating paper in accordance with the present invention.

The copolymer contains from 2 to 7% by weight of itaconic acid, maleic acid, or maleic anhydride units neutralized at least partly with ammonium hydroxide. The copolymer may contain a mixture of two or more salts providing in the copolymer from 2 to 7% or more, but ordinarily not over 7% of the several monomer units of this type. In no event should such an amount of these several units be used as to render the copolymer of water-soluble type. Optimum results are obtained when the proportion of the salt units is in the range from 2.5 to 5%. Instead of the preferred acids or anhydrides mentioned, there may be present in the copolymers, units derived from aconitic acid, fumaric acid, or from the dimer or trimer of methacrylic acid.

Generally, the copolymers contain at least 68% by weight of vinyl acetate and the preferred copolymers contain at least 78% by weight thereof. Whereas the copolymer may contain from 7 to 30% by weight of the alkyl acrylate having from 1 to 4 carbon atoms in the alkyl group, the preferred copolymers have 10 to 15% by weight thereof. Again, the $T_i$ of the copolymer may be any value over 20° C. up to about 35° C. but the optimum results are obtained with a $T_i$ value of about 24 to 29° C.

The salts of the acid copolymers are preferably formed with ammonium hydroxide, but there may be used instead an alkali metal hydroxide, such as that of sodium, potassium, or lithium, or a water-soluble amine such as triethylamine, diethanolamine, or triethanolamine. When the acid copolymer is obtained from a dicarboxylic anhydride, such as maleic anhydride, neutralization with ammonia can produce simply the ammonium salt of the acid copolymer resulting from hydrolysis of the anhydride groups or an ammonium salt of a half-amide or maleamic acid copolymer. Reference herein to the ammonium salt of the acid or anhydride copolymers is intended to include the simple salts as well as the half-amide salts.

The pigments that may be employed include clays, especially of the kaolin type, calcium carbonate, blanc fixe, talc, titanium dioxide, colored lakes and toners, ochre, carbon black, graphite, aluminum powder or flake, chrome yellow, molybdate orange, toluidine red, copper phthalocyanines, such as the "Monastral" blue and green lakes. The term "mineral" in the claims is intended to cover all such types of pigmentary matter whether of strict mineral character or partly of organic material. Generally it is preferred to employ a predominant proportion of clay as the pigment.

The amount of the binder in such coatings is from 8% to 25% by weight of the pigment, and is preferably 12% to 20% by weight thereof. In accordance with the present invention, the water-insoluble copolymer containing the polymerized salt generally constitutes the entire binder of the coating composition, though the copolymer may be combined with other binder material in the proportions of 99:1 to 5:95 weight ratio of the copolymer to the other binder material. Preferably, the copolymer amounts to at least about 50% of the total weight of the binder. Other binders that may be used include any of the polymers of the several patents mentioned above, casein, soya-protein, starch, chlorinated starch, and ethers of starch, such as hydroxyethyl-starch.

The copolymer dispersions may be made by any of the known emulsion copolymerization procedures, e.g., by first mixing the several monomers in the desired proportions into an aqueous solution of an anionic, or preferably a non-ionic, dispersing or emulsifying agent.

Examples of anionic emulsifying agents that may be used include the higher fatty alcohol sulfates, such as sodium lauryl sulfate, the alkylaryl sulfonates, such as the sodium salt of t-octylphenyl sulfonate, the sodium dioctyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way, it is possible to prepare dispersions which contain as little as 1% and as much as 60% or 70% of the resinous copolymer on a weight basis. It is, however, more practical—hence preferred—to produce dispersions which contain about 30% to 50% resin-solids.

The pigment or pigments are preferably mixed and dispersed in a small amount of water before mixing with the copolymer dispersion. When clay is used as a part of the pigment, and in preferred embodiments it forms a predominant proportion of the pigment, the dispersion is preferably adjusted to a pH of 8.5 to 9.5 to obtain the optimum dispersion of the clay.

After combining the pigment and copolymer dispersions, the resulting coating composition is applied to the paper or paperboard at a total solids concentration of at least 40% and preferably 60% to 70% by any suitable equipment, such as immersion roll and doctor system, gravure roller system, brush coater, or spray coater. It may be applied to the paper after drying, and/or conditioning. Alternatively it may be applied during the first drying operation on the paper where it has undergone only partial drying. For example, the coating system may be mounted at an intermediate point in the drier on the paper-making machine, such as at a point where the paper has been reduced to approximately 50% moisture content.

After the coating operation, the coated sheet is dried and may then be calendered and subsequently printed. The drying may be the usual type provided in which air at about 230° to 260° F. (110° to 130° C.) is directed against the paper for thirty to forty-five seconds. The paper and coating may reach a temperature of about 180° F. (ca. 85° C.) during the drying operation. Printing may be effected by the conventional inks of precipitation type or heat-setting type including those based on drying oils. The coated products of the present invention are receptive to single color inks and multi-color inks of graded viscosity and are able to withstand the pull of such inks. It may be overcoated, after printing, with wax, lacquer, or other compositions.

The coating on the substrate obtained from the composition of the present invention is essentially a mixture of the several components described hereinabove except that the copolymer salts are substantially converted into free acid, and/or amide, and/or imide, form as the result of the volatilization of ammonia or amine.

The coated products of the present invention are characterized by excellent bonding of the coating to the paper and outstanding cohesion within the coating itself so that at least as good, and in many cases superior, resistance to "pick" by inks during printing is obtained as compared to the coated products of the patents previously mentioned.

FIG. 1 shows a paper base 4 carrying a coating 3 on one surface thereof. The coating is obtained as illustrated in the flow diagram of FIG. 2 by applying to the sheet 4 (in step 5) an aqueous dispersion of the salt of a copolymer of one of the polybasic acids mentioned above which contains a pigment or mineral component, drying the coated paper (step 6), optionally calendering (step 7) and optionally printing (step 8).

In the following examples, which are illustrative of the present invention, the parts and percentages are by weight unless otherwise noted. The ink numbers referred to designate standard inks of the Institute of Printing having graded tackiness increasing from No. 1 to No. 6, ink No. 3 having a viscosity of 20 poises; ink No. 4, 25 poises; and No. 5, 30 poises. An IGT printability tester was used to determine the critical speed of the periphery of a rotating variable-speed ink-applying roll at which the coating fails, i.e., the minimum speed at which the coating is pulled away from the paper by the adhesion of the ink to the roll and the coating.

*Example 1*

(a) A dispersion of pigments was prepared having the following composition: coating grade pre-dispersed clay (kaolinite), 80 parts; titanium oxide (anatase), 20 parts; water, 43 parts; sodium hexametaphosphate, 0.001 part; and 28% ammonia, 0.0031 part. The pH of this dispersion was 9.0. To this pigment dispersion was added 19.4 parts (equivalent to 8.0 dry parts) of an aqueous dispersion (41.3% solids) of a copolymer having a $T_i$ of $+24°$ C. and the composition: vinyl acetate, 77.5 parts; ethyl acrylate, 20 parts; itaconic acid, 2.5 parts; prepared in the presence of 6% (on monomer) of a non-ionic emulsifier tert-octylphenoxypolyethoxyethanol having an average of about 40 moles of oxyethylene units and a redox catalyst, comprising 0.1% (on monomer) of tert-butyl hydroperoxide, 0.23% (on monomer) of ammonium persulfate, 0.4% (on monomer) of sodium metabisulfite, and traces of ferric iron.

Following mixing of the polymer and pigment dispersions, the total solids were adjusted to 60% by addition of water and the pH adjusted to 9 by addition of ammonium hydroxide. The coating composition was then applied to dry chipboard (0.017 inch thick) by means of a No. 8 wire-wound rod. About 5 to 6 pounds dry weight of coating composition were applied per 1,000 square feet of the board to one surface. The coated board was dried in an air-heated oven at 185° F. for 45 to 60 seconds, then calendered by rolls at a room temperature at a pressure of 50 lbs./lineal inch. The coated board had a smooth, ink-receptive surface.

(b) The board obtained in part (a) was compared directly with a coated board prepared in the same way but with the polymeric binder of U.S. Patent 2,790,736, Example 1, also used at 8% on the pigments by means of the IGT Printability Tester with the following results:

| Polymer Composition | Polymer $T_i$, ° C. | IGT Tester—Failure Speed (feet/min.) | |
|---|---|---|---|
| | | Ink No. 3 | Ink No. 4 |
| Part (a) | +24 | 260 | 220 |
| Example 1 of U.S. Patent 2,790,736 | −3 | 180 | 145 |

(c) In order to illustrate the deleterious effect of hardening comonomers other than vinyl acetate when the polymer $T_i$ exceeds +20° C., a polymer dispersion having the composition: ethyl acrylate, 50 parts; vinylidene chloride, 47.5 parts; itaconic acid, 2.5 parts was prepared in a manner similiar to that used with the polymer of part (a). This polymer had a $T_i$ of +22° C. It was compared with the polymer of U.S. Patent 2,790,736, Example 1, by use with the same pigment composition as in part (a) and at 8% binder expressed on pigments similarly applied to a good grade of coating base paper (rather than the paperboard of part (a) with the following results.

| Polymer Composition | Polymer $T_i$, ° C. | IGT Tester—Failure Speed (feet/min.) | |
|---|---|---|---|
| | | Ink No. 4 | Ink No. 5 |
| Part (c) | +22 | less than 10 | less than 10 |
| Example 1 of U.S. Patent 2,790,736 | −3 | 75 | 40 |

*Example 2*

The procedure of part (a) of Example 1 was followed substituting a copolymer having the composition: vinyl acetate 87.5 parts, butyl acrylate 10 parts, itaconic acid 2.5 parts. This polymer had a $T_i$ of +29° C. It was compared with the polymer of $T_i$ −3° C. of Example 1 of U.S. Patent 2,790,736 exactly as was that of Example 1(a). The bonding strengths measured as ft./minute for numbers 3 and 4 ink were 180 and 140, essentially equivalent to those obtained with the patented composition.

*Example 3*

The procedure of Example 1(a) was followed exactly substituting a copolymer having the composition: vinyl acetate 87.5 parts, ethyl acrylate 10 parts, maleic anhydride 2.5 parts, which had a $T_i$ of +34° C. The coated board was tested as in Example 2. The bonding strengths measured as ft./minute peripheral speed at failure for numbers 3 and 4 ink where 190 and 170 respectively, definitely superior to those for the patented board.

*Example 4*

The polymer of Example 1(a) ($T_i$ +24° C.) was used as binder in a pigment composition consisting only of kaolinite (no anatase) and at 16% expressed on pigment (instead of 8%). When this composition was applied to paperboard and tested, the results were as follows:

| IGT Tester—Failure Speed (ft./minute) | |
|---|---|
| Ink No. 3 | Ink No. 4 |
| 230 | 190 |

We claim:

1. A mineral-coated paper product comprising a paper sheet carrying on a surface thereof a dried deposit of a coating comprising (1) a finely divided pigmentary material and (2) from 8 to 25 parts by weight, for each 100 parts by weight of the pigment, of a binder comprising a water-insoluble ammonium salt of a copolymer of at least 68% by weight of vinyl acetate, 7 to 30% by weight of at least one lower alkyl acrylate in which the alkyl group has from 1 to 4 carbon atoms, and 2 to 7% by weight in the copolymer of at least one member selected from the group consisting of itaconic acid, maleic acid, and maleic anhydride, said copolymer having a $T_i$ value over 20° C. up to about 35° C.

2. A product as defined in claim 1 in which the pigmentary material contains clay.

3. A product as defined in claim 1 in which the copolymer has a $T_i$ value in the range of about 24 to 29° C.

4. A mineral-coated paper product comprising a paper sheet carrying on a surface thereof a dried deposit of a coating comprising (1) a finely divided pigmentary material and (2) from 8 to 25 parts by weight, for each 100 parts by weight of the pigment, of a binder comprising a water-insoluble ammonium salt of a copolymer of at least 68% by weight of vinyl acetate, 10 to 15% by weight of at least one lower alkyl acrylate in which the alkyl group has from 1 to 4 carbon atoms, and 2.5 to 5% by weight in the copolymer of at least one acid selected from the group consisting of itaconic acid, maleic acid, and maleic anhydride, said copolymer having a $T_i$ value of about 24 to 29° C.

5. A mineral-coated paper product comprising a paper sheet carrying on a surface thereof a dried deposit of a coating comprising (1) a finely divided pigmentary material and (2) a binder comprising, for each 100 parts by weight of the pigment, from 8 to 25 parts by weight of a water-insoluble ammonium salt of a copolymer of at least about 68% by weight of vinyl acetate, 7 to 30% by weight of ethyl acrylate, and 2.5% to 7% by weight of maleic anhydride said copolymer having a $T_i$ value over 20° C. up to about 35° C.

6. A mineral-coated paper product comprising a paper sheet carrying on a surface thereof a dried deposit of a coating comprising (1) a finely divided pigmentary material and (2) a binder comprising, for each 100 parts by weight of the pigment, from 8 to 25 parts by weight of a water-insoluble ammonium salt of a copolymer of at least about 68% by weight of vinyl acetate, 7 to 30% by weight of ethyl acrylate, and 2.5% to 7% by weight of itaconic acid, said copolymer having a $T_i$ value over 20° C. up to about 35° C.

References Cited in the file of this patent

UNITED STATES PATENTS 2,790,736    McLaughlin et al. _____ Apr. 30, 1957